(12) United States Patent
Trouillot et al.

(10) Patent No.: US 11,326,862 B2
(45) Date of Patent: May 10, 2022

(54) AERODYNAMIC BRAKING DEVICE FOR A PAYLOAD CASING

(71) Applicant: NEXTER MUNITIONS, Versailles (FR)

(72) Inventors: Christian Trouillot, Bourges (FR); Frédéric Carreau, Bourges (FR); Cécile Grognet-Quenecan, Bourges (FR)

(73) Assignee: NEXTER MUNITIONS, Versailles (FR)

( * ) Notice: Subject to any disclaimer, the term of this patent is extended or adjusted under 35 U.S.C. 154(b) by 380 days.

(21) Appl. No.: 16/623,047

(22) PCT Filed: Jun. 13, 2018

(86) PCT No.: PCT/EP2018/065589
§ 371 (c)(1),
(2) Date: Dec. 16, 2019

(87) PCT Pub. No.: WO2018/229092
PCT Pub. Date: Dec. 20, 2018

(65) Prior Publication Data
US 2021/0148685 A1    May 20, 2021

(30) Foreign Application Priority Data
Jun. 14, 2017   (FR) ....................................... 1700634

(51) Int. Cl.
*F42B 10/56*    (2006.01)
*B64D 17/44*    (2006.01)
(Continued)

(52) U.S. Cl.
CPC .............. *F42B 10/56* (2013.01); *B64D 17/44* (2013.01); *B64D 17/50* (2013.01); *B64D 17/76* (2013.01)

(58) Field of Classification Search
CPC .................................. F42B 10/56; F42B 4/28
(Continued)

(56) References Cited

U.S. PATENT DOCUMENTS 2,198,697 A * 4/1940 Driggs, Jr. ................ F42B 4/28
                                                          89/1.51
4,013,009 A     3/1977 Claude et al.
(Continued)

FOREIGN PATENT DOCUMENTS

EP     1 719 969 A1    11/2006
EP     2 863 164 A1    4/2015
(Continued)

OTHER PUBLICATIONS

Sep. 10, 2018 Search Report issued in International Patent Application No. PCT/EP2018/065589.
(Continued)

*Primary Examiner* — Reginald S Tillman, Jr.
(74) *Attorney, Agent, or Firm* — Oliff PLC

(57) ABSTRACT

An aerodynamic braking device for a payload casing intended to be ejected from a projectile on its trajectory including at least one parachute connected to the casing by hangers, the parachute and the parachute hangers being housed in a sleeve. The sleeve is wound around an axis of winding perpendicular to its longitudinal direction and attached to a cylindrical housing the axis of which is parallel to the axis of winding, which housing is itself secured to a shell base that closes off the projectile, the hangers being connected to the casing by an extension cable which is wound around the axis of the housing and attached thereto by at least three peripheral break lines which are uniformly angularly distributed.

7 Claims, 4 Drawing Sheets

(51) Int. Cl.
*B64D 17/50* (2006.01)
*B64D 17/76* (2006.01)

(58) Field of Classification Search
USPC ............................... 102/337, 339, 340, 348
See application file for complete search history.

(56) References Cited

U.S. PATENT DOCUMENTS

| | | | |
|---|---|---|---|
| 4,423,660 A | | 1/1984 | Ouellette |
| 5,111,748 A | * | 5/1992 | Thurner .................. F42B 12/62 |
| | | | 102/393 |
| 5,239,927 A | | 8/1993 | Frye et al. |
| 7,745,767 B2 | | 6/2010 | Bredy |

FOREIGN PATENT DOCUMENTS

| | | | | |
|---|---|---|---|---|
| FR | 2 260 772 A1 | | 9/1975 | |
| FR | 2 654 505 A1 | | 5/1991 | |
| FR | 2 679 642 A1 | | 1/1993 | |
| FR | 2960633 A1 | * | 12/2011 | .............. F42B 12/56 |
| GB | 2 348 942 A | | 10/2000 | |
| JP | H10-132499 A | | 5/1998 | |

OTHER PUBLICATIONS

Sep. 10, 2018 Written Opinion of the International Searching Authority issued in International Patent Application No. PCT/EP2018/065589.
Feb. 23, 2018 Search Report and Written Opinion issued in French Patent Application No. 17/00634.

\* cited by examiner

AERODYNAMIC BRAKING DEVICE FOR A PAYLOAD CASING

The technical field of the invention is that of aerodynamic braking devices for a casing incorporating a payload and intended to be ejected from a projectile on its trajectory.

It is well known to design projectiles that eject a payload on their trajectory from the rear, for example a flare (as described by patent FR 2,260,772), or an explosive attack module (as described by patent EP 1,719,969), or a miniaturized drone.

The projectile that ejects the payload is an artillery shell (that is to say, a gyrostabilized projectile with a high rotation speed) or a rocket (that is to say, an aerostabilized projectile with a low rotation speed). In all cases, the projectile is driven at a relatively high speed along a ballistic trajectory (speed in the order of several hundreds of meters per second).

The payload is most often incorporated into a cylindrical casing (often referred to as a canister).

This casing serves to ensure the transition between the flight envelopes of the projectile and the payload. Indeed, the orders of magnitude of the translation and rotation speeds are different, and it is necessary to slow the rotation and the speed of the casing. For example, for a flare, to ensure optimal operation, the rotation speed must not exceed several revolutions per second.

After braking of the casing, the payload is ejected from the latter by a gas-generating composition.

In the case of an illumination projectile, the payload must next be aerodynamically braked to be able to adopt a vertical descent trajectory and a speed of several meters per second to allow the illumination of the terrain while respecting the illuminated surface and illumination time specifications. In the case of a projectile dispersing a payload of the attack module type, the aerodynamic braking also allows the latter to adopt a vertical descent trajectory, making it possible to look for targets in an area.

A conventional braking means for a casing consists of a parachute. One difficulty encountered with parachutes is that an excessively rapid deployment of the latter risks leading to mechanical interference with the base closing off the projectile, which is ejected with the casing containing the payload.

Indeed, the braking system is positioned between the base and the casing during the ejection phase. The braking of the casing thus causes it to be caught by the base.

To date, there is no reliable solution making it possible to control the opening moment of the parachute and therefore making it possible to ensure that this opening is not hindered by the presence of the base.

To date, there is also no effective solution making it possible to shift the trajectory of a monolithic base at the time of the ejection of the casing.

It is the aim of the invention to propose an architecture of a braking device making it possible to control this opening moment of the parachute with respect to the relative ballistics of the base and the ejected casing and to avoid any interference between the textile elements of the braking system and a base.

The invention thus relates to an aerodynamic braking device for a casing of a payload intended to be ejected from a projectile on its trajectory, the braking device including at least one parachute connected to the casing by hangers, the parachute being housed in a sleeve, the device being characterized in that:

the sleeve is wound around an axis of winding perpendicular to its longitudinal direction, and attached to a cylindrical housing, the axis of which is parallel to the axis of winding, the housing in turn being secured to a base that closes off the projectile;

the hangers are connected to the casing by means of an extension cable;

the extension cable is wound around the axis of the housing and attached thereto by at least three peripheral break lines, which are uniformly angularly distributed.

Advantageously, the sleeve may include at least two longitudinal compartments, one for a canopy of the parachute and the other for the hangers, the two components being adjacent and parallel to one another.

The sleeve can be connected to the housing by four radial straps that will be fastened to one another by a central break line that will be broken by the extension cable after the breaking of the last peripheral break line.

The sleeve can advantageously bear a closed textile loop that is fastened at its rear end opposite the opening of the compartments, the textile loop serving to ensure aerodynamic braking of the sleeve, thus facilitating the extraction of the hangers and the canopy of the parachute from the sleeve.

According to one feature, the textile loop can be fastened to the sleeve by tabs extending over substantially the entire length of the sleeve.

According to one embodiment, the payload can be arranged in a pot that will be ejected from the casing after braking of the latter.

According to another embodiment, the payload can be arranged in the casing itself, the casing being arranged inside a cartridge ensuring a rotational braking.

The invention will be better understood upon reading the following description of one specific embodiment, the description being done in reference to the appended drawings, in which:

FIG. 5b is a partial view of the sleeve bearing a textile loop, view along direction V identified in FIG. 5a;

Figure 1:
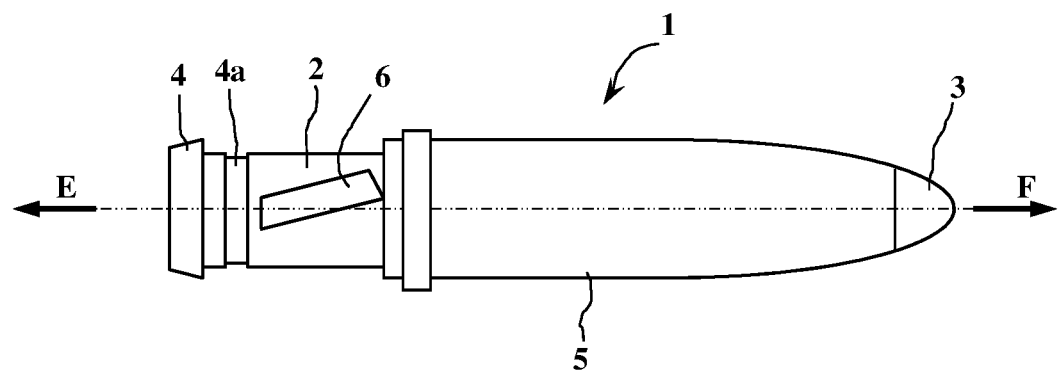
FIG. 1 shows a gyrostabilized projectile ejecting a casing of a payload on the trajectory, at the beginning of the ejection.

In reference to FIG. 1, a projectile 1 ejects, on its trajectory, a casing 2 containing a payload, for example a pot of illuminating pyrotechnic composition. Conventionally, the ejection is controlled by a chronometric fuze 3 that causes the ignition of a gas-generating charge, the pressure of which is exerted on the casing 2 along the ejection direction E and on the warhead in the direction F.

Figure 2:
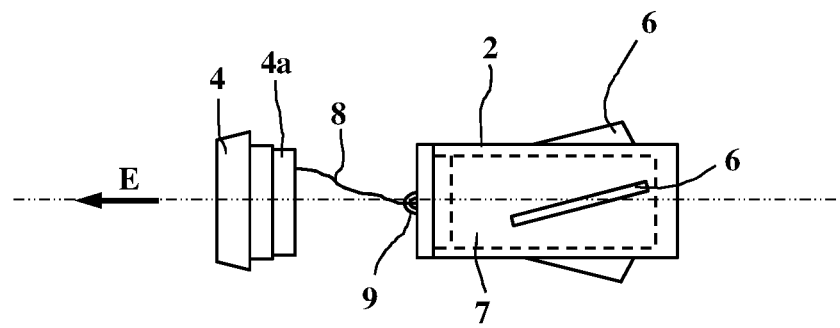
FIG. 2 shows the payload casing connected to the base.

The pressure also causes the shearing of the mechanical link that was connecting a base 4 to the body 5 of the projectile 1. FIG. 2 shows the casing 2 once it is ejected from the projectile body. The casing bears fins 6 that allow its rotational braking. Such fins are the subject matter of patent application EP 2,863,164; it is therefore not necessary to describe them in more detail. The casing 2 contains a payload pot 7 (shown in dotted lines). According to this embodiment, the pot 7 is subsequently ejected from the casing 2, after braking of the latter by the device according to the invention. The ejection will be ensured by a gas-generating composition after combustion of a pyrotechnic delay (conventional elements not shown). Another parachute (not shown) will be housed in the casing 2 in order to allow the braking of the descent of the pot 7.

Figure 7:
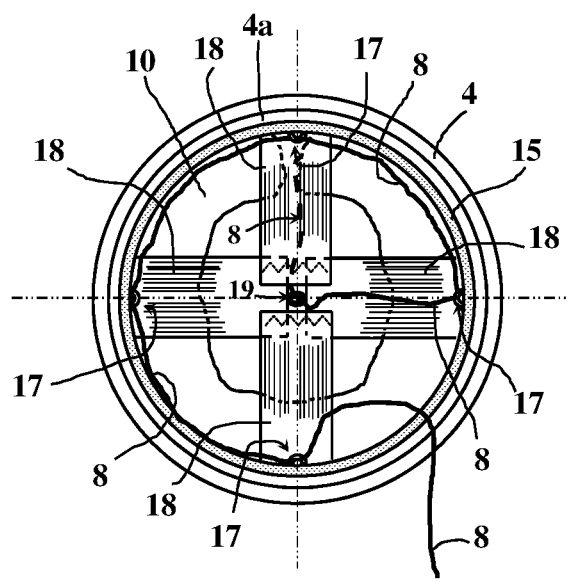
FIG. 7 shows a front view of the base bearing the sleeve of the parachute.

The base 4 bears an interface part 4a that is screwed on the base and in which a plastic housing 15, that contains the braking device, is encapsulated (FIG. 7).

According to FIG. 2, the base 4 has begun to distance itself from the casing 2. An extension cable 8 connects the casing 2 to a parachute that is housed inside the base 4. In order not to twist the extension cable 8, which would have the harmful effect of shortening it, the cable 8 is connected to the casing 2 by means of a freely rotating swivel 9. The swivel is equipped with a ball bearing suitable for high speeds. The base 4 indeed retains its initial high rotation speed, which may reach more than 200 revolutions per second for an artillery shell.

Figure 8:
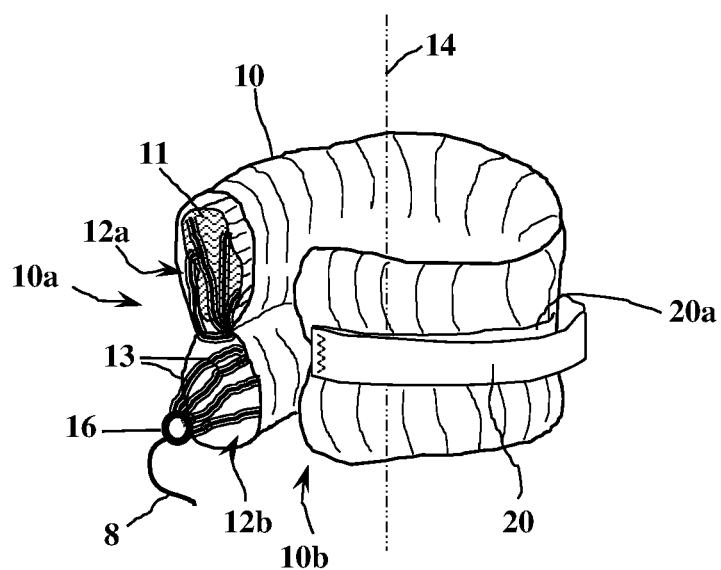
FIG. 8 shows a schematic perspective view of the parachute sleeve with its two compartments before it is placed in its housing.

FIG. 8 shows a sleeve 10 inside which the parachute 11 is housed in the folded state. The sleeve 10 is in the form of a rectangular pouch (see FIGS. 5a and 5b), the pouch including two longitudinal compartments, a first compartment 12a for receiving the canopy of the parachute 11 and a second compartment 12b for housing the hangers 13 of the parachute 11.

Figure 5A:
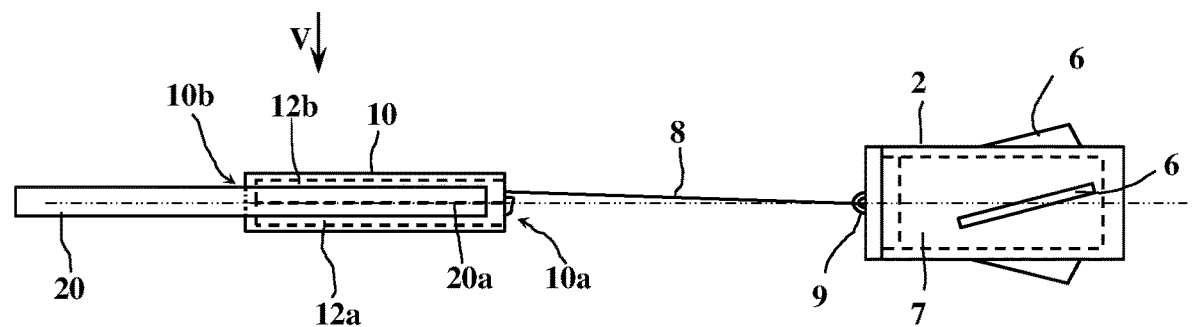
FIG. 5a shows the uncoiling step of the extractor tape and the beginning of the extraction of the parachute from the sleeve.

As shown in FIG. 5a, which shows the sleeve 10 unfolded, the two compartments 12a and 12b are adjacent and parallel to one another.

The sleeve 10 is made from a synthetic material such as polyamide, in order to facilitate the extraction of the parachute from the casing 10 and also to reduce the bulk and mass.

As shown in FIG. 8, the sleeve 10 is wound around an axis of winding 14 that is perpendicular to its longitudinal direction (the length of the rectangular sleeve). This winding makes it possible to bring the opening 10a (or front end) of the sleeve and the bottom 10b (or rear end) of said sleeve closer together. It makes it possible to house the sleeve 10 inside a cylindrical housing 15 made from plastic material in a minimal volume (FIG. 7). The housing 15 is made from plastic material so as to avoid attacking the textile elements of the braking system during firing accelerations.

The axis of the housing 15 is parallel to the axis of winding 14 and is in turn secured to the base 4 by means of the interface part 4a, which is screwed on the base 4. The plastic housing 15 is encapsulated in the part 4a once this part is screwed on the base. The extension cable 8 is connected to the hangers 13 by a coupling 16.

As can be seen more clearly in FIG. 7, the extension cable 8 is wound around the axis of the housing 15 and it is fastened to the latter by at least four calibrated lines (called peripheral break lines) 17 that are uniformly angularly distributed.

The bottom of the plastic housing 15 is equipped with four peripheral slits and one central slit (not shown). The four straps 18 are sewn to one another and form a cross beneath the bottom of the housing 15. The four peripheral slits make it possible to pass the four ends of the straps 18 in order to close them up on the sleeve 10.

The four straps 18, once closed up on the sleeve 10, are fastened to one another by a central break line 19 that is also connected to the extension cable 8. This central break line 19 is taken up by a small loop that passes in the central slit and that is sewn on the straps 18 that cross one another beneath the housing.

Such an architecture leads to delaying the uncoiling of the extension cable 8 outside the housing 15. Indeed, the traction exerted by the extension cable 8 during the distancing of the base 4 (FIG. 2) leads to the successive breaking of the four peripheral break lines 17.

One thus controls the uncoiling sequence of the extension cable 8. It is only after breaking of the last peripheral break line 17 that the breaking of the central break line 19 occurs.

Figure 3:
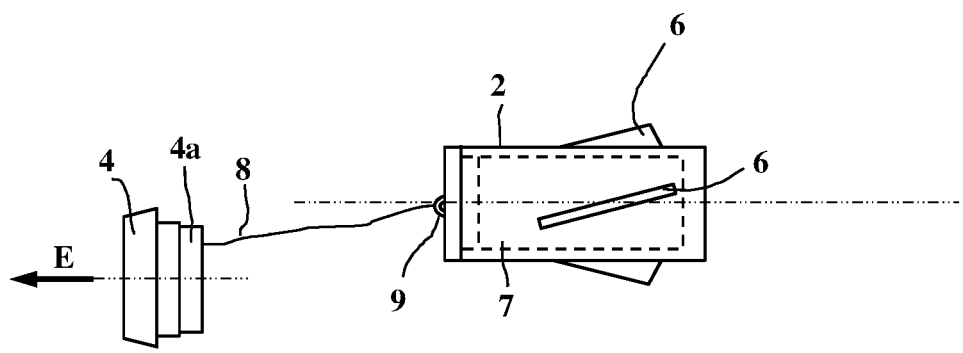
FIG. 3 shows a subsequent step for distancing of the base and the payload casing.

As can be seen in FIG. 3, after ejection outside the projectile, the base 4 shifts laterally relative to the casing 2. This shift is natural due to initial disruptions associated with the separation. The trajectories do not remain not perfectly collinear over time.

Figure 4A:
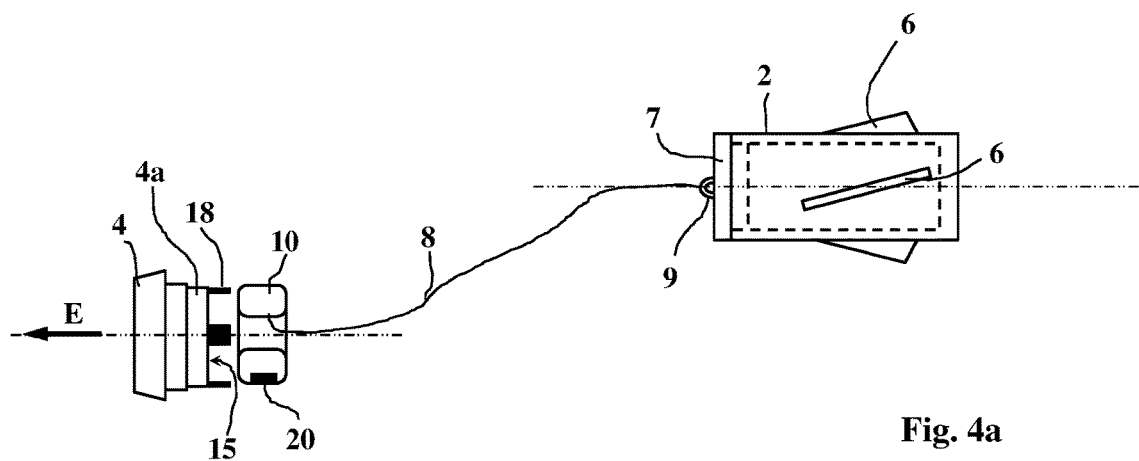
FIG. 4a shows the beginning of the separation step of the sleeve, containing the hangers and the canopy of the parachute, and the base.

As one can see in FIG. 4a, after breaking of the last peripheral break line, the straps 18 open and release the sleeve 10 equipped with a textile extraction loop 20. The shift between the base 4 and the casing 2 has increased over the course of the breaking of the break lines. This shift becomes compatible with an opening of the parachute without interference with the base.

Figure 4B:
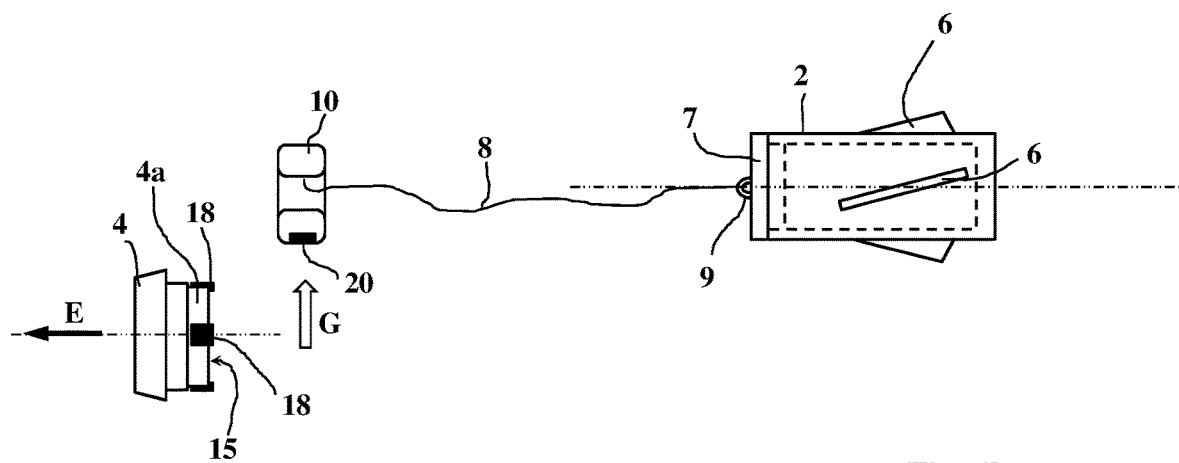
FIG. 4b shows the relative location of the base and the sleeve after their separation.

Under the effect of the relative distancing of the base 4 and the casing 2 and the still-high rotation of the base 4, the sleeve 10 is extracted from the plastic housing 15. As one can see in FIG. 4b, the sleeve 10, after extraction outside the base 4, is placed in the eye of the wind and repositions itself substantially colinearly to the trajectory of the casing 2 (movement along the arrow G). The straps 18, which are made from textile, fold along the interface part 4a under the effect of the aerodynamic pressure.

The sleeve 10 places itself practically instantaneously in the eye of the wind under the effect of the aerodynamic drag of the sleeve 10 and the textile loop 20 (FIG. 5a), and it therefore moves still further away from the base 4.

The invention thus makes it possible to delay the extraction moment of the sleeve 10 and the beginning of uncoiling of the textile elements to leave time for the base 4 to shift laterally naturally. The hangers and the canopy can therefore be extracted outside the sleeve 10 and they will uncoil with minimal risks of being cut and torn by the base.

Figure 5B:
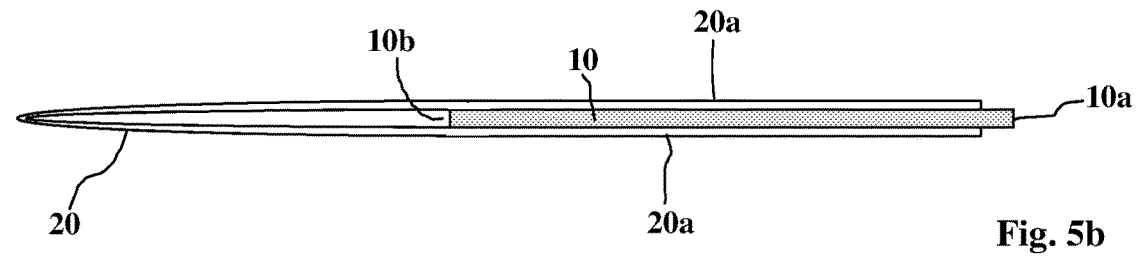
Figure 6:
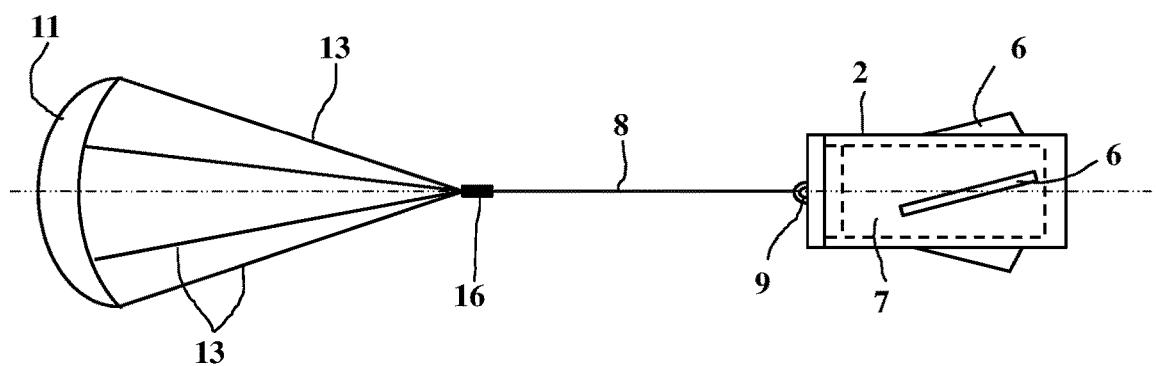
FIG. 6 shows the parachute fully deployed.

As one can see in FIGS. 5a and 5b, the sleeve 10 therefore bears a closed textile loop 20 that is fastened at its rear end 10b opposite the front end 10a of the sleeve 10 bearing the opening of the compartments 12a, 12b (see also FIG. 8).

The textile loop 20 serves to reliably ensure the extraction of the sleeve 10 and to release first the hangers 13, and next the canopy of the parachute 11 outside the sleeve 10. Such an arrangement accelerates the unfolding of the sleeve 10 and also facilitates the extraction of the hangers 13 and the canopy of the parachute 11 outside the sleeve 10.

The textile loop 20 is extended by tabs 20a (the ends of the loop 20) that extend over substantially the entire length of the sleeve 10, which makes it possible to sew the loop 20 over substantially the entire length of the sleeve 10 with the aim of reinforcing it and distributing the tensile force exerted by the loop 20 over a larger surface of the sleeve 10.

By delaying the deployment of the parachute 11, the invention makes it possible to ensure a distancing of the base 4 and the pot 7 that is sufficient to avoid any subsequent interference between the base 4 and the parachute 11. One thus increases the reliability of the aerodynamic braking device, which can always be deployed without hindrance.

The time delay results from the breaking of break lines 17, 19 that have a calibrated diameter and the mechanical breaking strength of which is well controlled. Under all firing conditions, in particular hot and cold, it is always the lines that break, thus ensuring the robustness of the behaviors, since any early uncoiling increases the collision risks. The time delay is thus ensured irrespective of the temperature to which the device is subjected.

In the embodiment that has been described, the payload is arranged in a pot that is ejected from the casing after braking thereof.

As a variant, it is possible to arrange the payload (for example, an illuminating composition) directly in the casing that is connected to the parachute. In this case, the casing will in turn be housed in a cartridge (not shown) that will bear rotating braking fins 6. Once the parachute 11 is deployed, the latter will be able to ensure the extraction of the casing from its rotational braking cartridge.

An embodiment has been described in which there are four peripheral break lines 17. It would be possible to provide only three uniformly distributed break lines. However, the time delay obtained to release the sleeve 10 from the base 4 will then be smaller.

Conversely, it is possible to provide more than four break lines 17, which will result in increasing the time necessary to release the sleeve 10.

The invention claimed is:

1. An aerodynamic braking device for a casing of a payload intended to be ejected from a projectile on its trajectory, the braking device including at least one parachute connected to the casing by hangers, the parachute being housed in a sleeve, wherein
   the sleeve is wound around an axis of winding perpendicular to a longitudinal direction of the sleeve, and attached to a cylindrical housing that has an axis which is parallel to the axis of winding, the cylindrical housing in turn being secured to a base that closes off the projectile;
   the hangers are connected to the casing by means of an extension cable;
   the extension cable is wound around the axis of the cylindrical housing and attached thereto by at least three peripheral break lines, which are uniformly angularly distributed.

2. The aerodynamic braking device according to claim 1, wherein the sleeve includes at least two longitudinal compartments, one for a canopy of the parachute and the other for the hangers, the two components being adjacent and parallel to one another.

3. The aerodynamic braking device according to claim 1, wherein the sleeve is connected to the cylindrical housing by four radial straps that will be fastened to one another by a central break line that will be broken by the extension cable after the breaking of the last peripheral break line.

4. The aerodynamic braking device according to claim 1, wherein the sleeve bears a closed textile loop that is fastened at a rear end of the sleeve opposite the opening of the compartments, the textile loop serving to ensure aerodynamic braking of the sleeve, thus facilitating the extraction of the hangers and the canopy of the parachute from the sleeve.

5. The aerodynamic braking device according to claim 4, wherein the textile loop is fastened to the sleeve by tabs extending over substantially the entire length of the sleeve.

6. The aerodynamic braking device according to one of claim 1, wherein the payload is arranged in a pot that is ejected from the casing after braking of the casing.

7. The aerodynamic braking device according to claim 1, wherein the payload is arranged in the casing itself, the casing being arranged inside a cartridge ensuring a rotational braking.

* * * * *